United States Patent [19]

Dawans

[11] Patent Number: 5,308,898

[45] Date of Patent: * May 3, 1994

[54] BITUMINOUS COMPOSITIONS INCLUDING RESIDUES OF THERMOPLASTIC POLYMERS WITH POLYURETHANE FOAMS AND THERMOSET RESIN, ETC.

[75] Inventor: Francois Dawans, Bougival, France

[73] Assignee: Institut Francais du Petrole, Rueil Malmaison, France

[*] Notice: The portion of the term of this patent subsequent to Apr. 14, 2009 has been disclaimed.

[21] Appl. No.: 658,613

[22] Filed: Feb. 21, 1991

[30] Foreign Application Priority Data

Feb. 21, 1990 [FR] France .............................. 90 02136

[51] Int. Cl.$^5$ .............................................. C08L 95/00
[52] U.S. Cl. ........................................ 524/59; 521/54; 521/55; 521/83; 521/101; 106/273.1; 106/281.1
[58] Field of Search ................... 521/54, 55, 83, 101; 524/59; 106/273.1, 281.1

[56] References Cited

U.S. PATENT DOCUMENTS

| | | | |
|---|---|---|---|
| 2,861,895 | 11/1958 | Hardman | 521/55 |
| 2,964,424 | 12/1960 | Mast | 521/55 |
| 3,257,336 | 6/1966 | Levy et al. | 521/55 |
| 3,298,971 | 1/1967 | Davie | 521/79 |
| 3,470,016 | 9/1969 | Biles et al. | 521/83 |
| 3,484,507 | 12/1969 | Smith | 264/40 |
| 3,491,047 | 1/1970 | Hotten | 524/500 |
| 3,783,134 | 1/1974 | Schoen | 524/67 |
| 4,000,095 | 12/1976 | Van Den Berg | 521/40 |
| 4,028,288 | 6/1977 | Turner | 521/140 |
| 4,120,832 | 10/1978 | Ceintrey | 521/46.5 |
| 4,419,469 | 12/1983 | Böhm et al. | 524/68 |
| 4,427,818 | 1/1984 | Prusinski | 524/442 |
| 4,490,493 | 12/1984 | Mikols | 524/68 |
| 4,650,820 | 3/1987 | Decroix | 525/69 |
| 4,677,146 | 6/1987 | Senz | 524/69 |
| 4,724,245 | 2/1988 | Lalanne et al. | 524/61 |
| 4,797,434 | 1/1989 | Lovatt-Smith | 524/60 |
| 4,818,367 | 4/1989 | Winkler | 208/23 |
| 4,874,432 | 10/1989 | Kriech et al. | 252/311.5 |
| 4,973,615 | 11/1990 | Futamura et al. | 524/66 |
| 4,987,166 | 1/1991 | Jacono et al. | 524/68 |
| 5,070,123 | 12/1991 | Moran | 524/59 |
| 5,095,055 | 3/1992 | Moran | 524/90 |
| 5,104,932 | 4/1992 | Dawans | 525/454 |
| 5,225,462 | 7/1993 | Mancini | 524/59 |
| 5,252,641 | 10/1993 | Dawans | 524/59 |

FOREIGN PATENT DOCUMENTS

| | | |
|---|---|---|
| 2408988 | 9/1975 | Fed. Rep. of Germany . |
| 56-36548 | 8/1979 | Japan . |
| 1272250 | 12/1986 | Japan . |
| 1016864 | 1/1989 | Japan . |
| 7305619 | 10/1974 | Netherlands . |
| WO88/02387 | 10/1987 | PCT Int'l Appl. . |
| 1419092 | 12/1975 | United Kingdom . |
| 1419093 | 12/1975 | United Kingdom . |

OTHER PUBLICATIONS

Encyclopedia of Polymer Science and Engineering, vol. 13, Poly(phenylene Ether) to Radical Polymerization, John Wiley & Sons, New York, pp. 264–274.

Primary Examiner—John Kight, III
Assistant Examiner—Rabon Sergent
Attorney, Agent, or Firm—Millen, White, Zelano & Branigan

[57] ABSTRACT

The invention relates to bituminous compositions obtained by the incorporation of thermoplastic polymer residues, particularly sterile car waste, containing polyurethane foams and thermoset resins, as well as their preparation process. The process consists of mixing previously ground polymer residues, so as to obtain an average particle size below 10 mm with melted asphalt or bitumen. The mixture is stirred at a temperature between 150° and 300° C., the presence of ground polyurethane foam and thermoset resin particles helping to increase the dissolving rate of the polymers. Preferably addition takes place of a catalyst and/or a reagent aiding a coupling reaction between the polymers and certain constituents of the bitumen or asphalt, which gives the final bituminous mixture improved properties. The bituminous compositions according to the invention can advantageously be used for coating solid materials.

16 Claims, No Drawings

BITUMINOUS COMPOSITIONS INCLUDING RESIDUES OF THERMOPLASTIC POLYMERS WITH POLYURETHANE FOAMS AND THERMOSET RESIN, ETC.

Polymers are at present used as additives in asphalts and bitumens used for roads or in industry, either for improving their use properties by modifying the hot rheological properties, or for improving their physico-chemical properties (cold brittleness, toughness, flexibility, stability, thermal susceptibility, mechanical strength with respect to shocks, vibrations, abrasions, etc.).

In general, the polymers used are thermoplastics (olefin copolymers or polymers), rubbers and in particular thermoplastic elastomers (multiblock copolymers of diolefin and styrene), or, to a lesser extent, thermosetting resins (polyurethanes, epoxy resin, phenol formaldehyde). According to the prior art, these polymers can be used alone or in mixture. For example, it has been proposed to recycle as additives in bitumens production waste materials (waxes of polyethylene, atactic polypropylene, polyvinyl alcohol, powdered vulcanized rubber waste, etc.) or plastic waste from household refuse and more specifically plastic packings. In the latter case, the mixtures of polymers essentially contain polyolefins, polyvinyl chloride, polystyrene and polyethylene terephthalate.

The polymers are added in small quantities (generally 2 to 10% by weight) to bitumens, in the form of "simple" mixtures involving no chemical reaction or interaction between the constituents, or in the form of "complex" mixtures involving a chemical reaction or interaction between the polymer and certain constituents of the bitumen (asphaltenes, malthenes, resins, etc.), optionally in the presence of a third constituent (catalyst, reagent). Usually, the polymers are dispersed in the solid or melted state in a previously heated bitumen excess and, after stirring, the mixtures are used in the melted state or are cooled to the solid state and optionally granulated or ground. In certain processes for the production of molten mixtures of bitumens for roads to which olefin polymers have been added, at least 5 to 30% by weight of mineral particles are added to speed up the dissolving of the polymer in the bitumen (cf., e.g., U.S. Pat. No. 3,336,252, which issued Aug. 5, 1967). U.S. Pat. No. 4,028,293, which issued Jun. 7, 1977, claims the production of a bitumen-containing material used particularly for roads and construction purposes which is obtained by the high temperature reaction (at least 180° C.) of a mineral compound, such as sand or gravel, with a polymer or a mixture of polymers obtained from domestic or household refuse. The hot resultant mixture is then added to the bitumen and cooled. A major disadvantage of this method is the total cost of the operation, which requires preheating a significant quantity of mineral material to a high temperature prior to the addition of the polymer or polymers.

The present invention relates to a simplified, economical process for recycling of polymer waste into bitumens for roads or industry. This process is particularly suitable for the recycling of "sterile car waste", i.e., plastic waste resulting from the demolition of cars and which may possibly contain other polymer waste materials in small proportions, e.g., resulting from the breaking up of electric domestic appliances.

The generic terms "sterile car waste" and "car crushing waste", in fact, designate all mineral and organic materials resulting from crushing or cutting into pieces, in particular, car bodies and, to a lesser extent, electric domestic appliances and industrial waste obtained after the separation of the main metallic materials, e.g., by magnetic sorting processes, by gravitation or hydrocloning, flotation or performed manually. The recovered metallic materials are recycled as starting or raw materials for the metallurgical industry. However, the recycling of "sterile" or non-metallic waste at present constitutes a major problem due to the heterogeneity of the material. Thus, it is a mixture having a variable composition of non-metallic mineral particles and various polymers such as expanded materials or foams, vulcanized rubber materials, synthetic fibres, thermoplastics and thermoset resins.

In view of the growing use of polymer materials in the construction of vehicles and electric household appliances, it has become necessary to find new means for disposing of such sterile materials which are economically and ecologically satisfactory While the disposal of most sterile car waste by incineration, as in the case of domestic refuse, has been proposed and the construction of incineration plants for sterile car waste is technically possible, it does not at present constitute the most fiscally or ecologically satisfactory solution in view of the constraints imposed by ensuring the removal of dust from the combustion smoke and fumes and preventing the discharge of toxic and corrosive gases. As in the case of plastic waste from packing and domestic refuse, the recycling of sterile car waste into second generation starting materials has also been considered, either alone or mixed with new, first generation materials. However, in view of its more heterogeneous composition, use of sterile car waste as recycled materials has been limited and is unlikely to proceed at a level sufficient to dispose of the increasing quantities of such waste. Therefore, most sterile car waste is presently stored in protected dumps, which involves ever-higher storage costs and which, despite all the precautions taken, constitutes a relatively unsatisfactory solution from an environmental standpoint.

Therefore, according to the present invention, the use of sterile car waste for improving the properties of bitumens or asphalts for use in roads and industry represents a useful and advantageous recycling solution, if simple, reliable technology exists for producing the mixtures. Contrary to the prior art processes, which are essentially limited to the recycling of domestic plastic refuse into bitumens, the improved process according to the present invention makes it possible to use more heterogeneous and complex mixtures such as sterile car waste.

The bitumen (asphalt) used according to the present invention is a natural constituent of mineral and crude oils. It is obtained by deasphalting, e.g., by propane precipitation, or distilling refining products (pitch) and/or petroleum cracking products. It can also be obtained from coal tar.

Within the scope of the invention, it is also possible to use a fluxed bitumen, e.g., with the aid of aromatic residues or distillates or oxidized or blown bitumen.

The fundamental originality of the present invention resides in valorizing complex mixtures of organic polymers produced when cars and, to a lesser extent, electric domestic appliances and industrial waste are crushed or cut into pieces, adding them to bituminous and asphalt binders and improving certain properties in order to use them to coat solid materials, such as gravel, or as coatings or covers particularly in road construction, buildings, public works and special equipment.

The process according to the invention relates to the improvement of the physicochemical and mechanical properties of bitumens and asphalts by the incorporation of polymer residues, particularly sterile car waste.

Polymer residues, and sterile car waste in particular, containing at least 6% by weight polyurethane foam and thermoset residues, e.g., of the epoxy or polyester type, are preferably crushed or ground so as to obtain a particle size below 10 mm. If necessary, they are washed with water to eliminate soil. The damp product is mixed with melted bitumen at a concentration varying as a function of the sought properties, e.g., between 1 and 40% and preferably between 2 and 15% by weight based on the bitumen weight. The mixture is heated, accompanied by stirring, preferably at atmospheric pressure, to a temperature between 150° and 300° C. for at least 5 minutes. This treatment dissolves most of the polymers and eliminates the washing water. The presence of at least 4% by weight polyurethane foams in sterile car waste facilitates the dissolving of the polymers and ground thermoset resin particles which are also present in sterile car waste, in a concentration of at least 2% by weight, behave in the same manner of a charge or filler, also contributing to increasing the dissolving rate of the polymers.

According to a preferred embodiment of the invention, to the mixture of bitumen and sterile car waste is added a catalyst, e.g., a Lewis or Broensted acid, such as aluminum bromide or chloride, boron trifluoride etherate or trifluoro acetic acid, at a concentration between 0.5 and 10% by weight based on the weight of the sterile car waste. During heating to above 150° for at least 5 minutes, the catalyst causes a coupling reaction between the polymers and certain constituents of the bitumen, which gives the final mixture improved properties such as stability, thermal susceptibility and resistance to vibrations and abrasion.

According to a preferred embodiment of the invention, to the mixture of bitumen and sterile car waste is added a reagent, such as an alkaline earth or alkali metal oxide, such as calcium oxide, at a concentration of 2 to 20% by weight, based on the weight of the sterile car waste. During heating at a temperature above 150° C., the reagent reacts with certain polymers, e.g., polyvinylchloride, by fixing the chlorine and hydrochloric acid discharged, and it also leads to a coupling reaction between the polymer and certain bitumen constituents. When a specific property is sought, within the scope of the invention, it is also possible to add to the mixture of bitumen and sterile car waste a small quantity, e.g., 2 to 10% by weight based on the bitumen weight, of a polymer not encountered in the sterile car waste, such as e.g., a copolymer of olefin and unsaturated ester or a thermoplastic rubber based on multiblock styrene and diene copolymers, which may be hydrogenated.

In particular, the invention also relates to the use of a composition by dissolving or dispersion said composition in a melted bitumen excess, so as to supply a composition for coating solid materials.

The following examples illustrate the invention.

EXAMPLE 1

A mixture of sterile car waste containing approximately 40% by weight polyvinylchloride, 30% by weight polyolefins, 6% by weight polyurethane foam, 3% by weight thermoset polyepoxy and polyester resins and 21% by weight of various other polymers such as rubbers is crushed in a impeller beaker, so as to obtain particles with a size between 2 and 4 mm and the powdery mixture obtained is washed with water at ambient temperature. 8.8 kg of bitumen with a penetratability of 82 (measured according to ASTM - DS standard) and a softening point of 54° C. (measured according to the ASTM - D 36 ball and ring method) are melted by heating to 190° C. Accompanied by stirring, addition takes place of 1.2 kg of moist sterile car waste powder and the mixture is mixed for 30 minutes, whilst discharging the evaporated water. In this way a homogeneous mixture is obtained, which can be used directly in the melted state, or cooled and granulated by a conventional procedure. The softening point of the mixture is 88° C.

EXAMPLE 2

If, everything else being equal, in Example 1 addition takes place of 36 g of aluminium trichloride, a final structure with a softening point of 108° C. is obtained.

EXAMPLE 3

If, everything else being equal, in Example 1 96 g of calcium oxide are added, a final mixture is obtained with a softening point of 120° C.

EXAMPLE 4

If, everything else being the same, in Example 1 addition takes place of 220 g of 3-block styrene-ethylene/butylene-styrene copolymer (KRATON G), a bituminous mixture is obtained with a softening point of 84° C. and whose elasticity, low temperature flexibility and aging resistance properties are improved.

I claim:

1. In a process for obtaining a bituminous composition containing polymer waste, said process comprising mixing a bitumen or asphalt with a polymer waste, the improvement wherein said polymer waste consists essentially of thermoplastic polymers and sterile car waste having at least 4% by weight, based on the weight of said polymer waste, or polyurethane foams and at least 2% of thermoset resins other than polyurethane foams, wherein said sterile car waste is ground to a particle size of less than 10 mm and mixed, in an amount of 1–40% by weight based on the bitumen or asphalt, with molten bitumen or asphalt, adding to the mixture of the bitumen or asphalt and waste polymer 0.5 to 10% by weight of Lewis or Brönsted acid, based on the total weight of the polymers in the bitumen or asphalt, and wherein the mixture is heated at a temperature of 150°–300° C. for at least 5 minutes.

2. A product produced by the process of claim 1.

3. A process for providing a coating composition, said process comprising dissolving or dispersing the bituminous composition according to claim 2 in a molten excess of bitumen.

4. A product prepared by the process of claim 3.

5. A process according to claim 1, further comprising adding 2 to 10% by weight of a thermoplastic rubber, based on the bitumen or asphalt weight.

6. A product produced by the process of claim 5.

7. A process for providing a coating composition, said process comprising dissolving or dispersing the bituminous composition according to claim 6 in a molten excess of bitumen.

8. A product prepared by the process of claim 7.

9. A process according to claim 1 wherein moist polymer waste, which has previously been washed with water, is introduced into the melted asphalt or bitumen and heated to 150° to 300° C.

10. A product produced by the process of claim 9.

11. A process for providing a coating composition, said process comprising dissolving or dispersing the bituminous composition according to claim 10 in a molten excess of bitumen.

12. A product produced by the process of claim 11.

13. In a process for obtaining a bituminous composition containing polymer waste, said process comprising mixing a bitumen or asphalt with a polymer waste, the improvement wherein said polymer waste consists essentially of thermoplastic polymers and sterile car waste having at least 4% by weight, based on the weight of said polymer waste, of polyurethane foams and at least 2% of thermoset resins other than polyurethane foams, wherein said sterile car waste is ground to a particle size of less than 10 mm and mixed, in an amount of 1–40% by weight based on the bitumen or asphalt, with molten bitumen or asphalt, adding to the mixture of bitumen or asphalt and waste polymer 2 to 20% by weight of alkaline earth or alkali metal oxide, based on the total weight of the polymers in the bitumen or asphalt.

14. A product prepared by the process of claim 13.

15. A process for providing a coating composition, said process comprising dissolving or dispersing the bituminous composition according to claim 14 in a molten excess of bitumen.

16. A product prepared by the process of claim 15.

* * * * *